Figure 1:
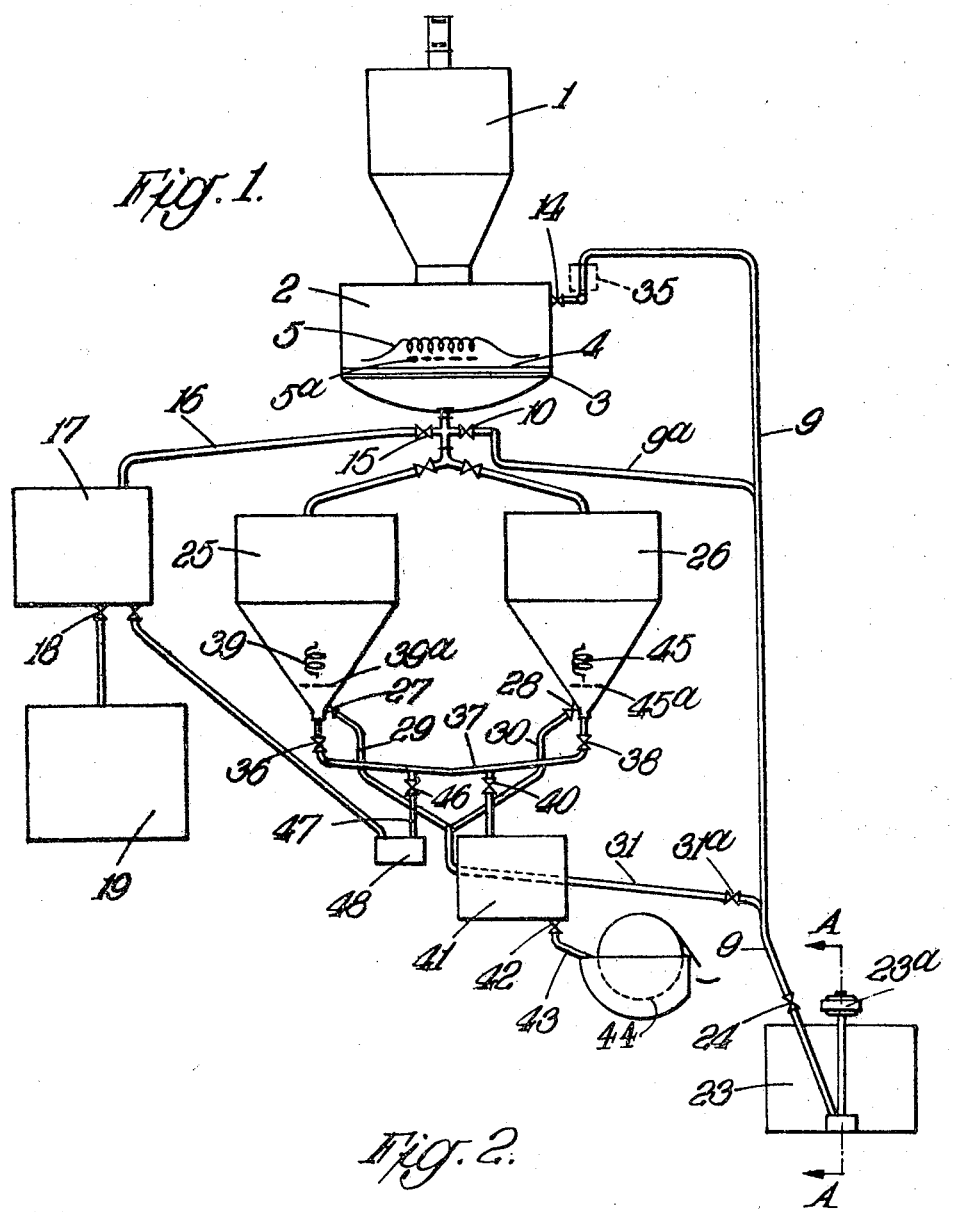

Jan. 25, 1944.  R. SYERS  2,340,232
PROCESS FOR THE EXTRACTION OF COMPONENTS FROM SOLID MIXTURES
Filed Oct. 28, 1941

INVENTOR
ROLAND SYERS
BY
Young, Emery & Thompson
ATTYS.

Patented Jan. 25, 1944

2,340,232

UNITED STATES PATENT OFFICE 2,340,232

PROCESS FOR THE EXTRACTION OF COMPONENTS FROM SOLID MIXTURES

Roland Syers, London, England, assignor to F. W. Berk and Company Limited, London, England Application October 28, 1941, Serial No. 416,916
In Great Britain November 6, 1940

2 Claims. (Cl. 23—312)

This invention relates to a process for the extraction of sulphur and tar from spent oxide.

The present invention provides a process of extracting sulphur and tar from spent oxide wherein the spent oxide is treated with trichlorethylene, tetrachlorethane or pentachlorethane in the liquid phase at a temperature at which tar is soluble to a substantial extent but at which the sulphur is relatively insoluble and thereafter the residue is treated with a further quantity of the same solvent in the liquid phase at a higher temperature at which the sulphur is soluble to a substantial extent.

The spent oxide, after having been used in the purification of coal gas, contains about 40% to 60% of sulphur and contains about one to three per cent. of tar which is soluble in carbon disulphide, but I have found that the actual amount of tar which is contained in the spent oxide is considerably greater since not all the tar is soluble in carbon disulphide.

The solvent which is employed, i. e. either trichlorethylene, tetrachlorethane or pentachlorethane, is used at such pressures and temperatures that extraction takes place in the liquid phase, and of these solvents I prefer to employ tetrachlorethane, since this solvent dissolves tar readily at all temperatures but to a greater extent when warm, but sulphur only dissolves therein to the extent of about 1% at 15° C., and about 20% at the melting point of sulphur (115° C.) whilst the sulphur is miscible in all proportions with the solvent at the boiling point of the solution (130° C.).

The process of the invention is conveniently carried out as follows: the spent oxide is first washed with the solvent at a temperature of about 60 to 80° C. which dissolves practically all the tar, but only a little of the sulphur, and after the solvent has been separated from the treated mass the residue is covered with a fresh quantity of solvent and boiled, whereby a practically pure solution of sulphur in the solvent is obtained. If necessary, further extraction of sulphur may be effected with a fresh quantity of solvent. A countercurrent system may also be used, that is, solvent separated from the crystals of one batch may be used to wash the next batch of crude material. I have elaborated a system whereby solvent is used for several such operations before recovery.

It is found that if tetrachlorethane is employed as the solvent it dissolves about 8% of tar calculated on the weight of the spent oxide and the tar contains about 10% of sulphur. Practically pure sulphur is obtained and only about 0.8% of the total sulphur is lost in the tar. The solvent can be recovered from the tar solution by steam distillation almost quantitatively and no vapour absorption plant is needed.

The recovery of the sulphur is preferably effected as described in my co-pending application No. 416,917.

Figure 2:
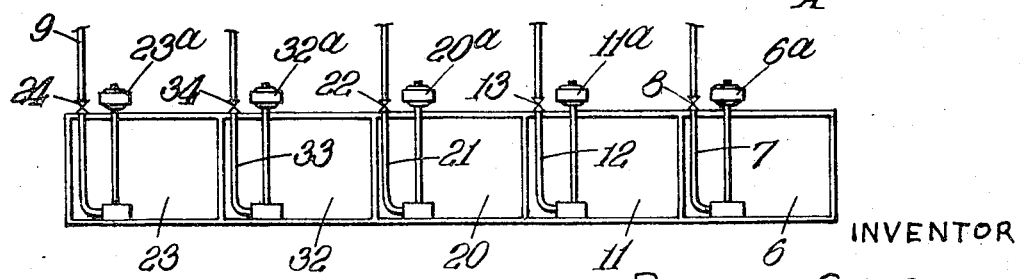

The carrying out of the process of the invention will now be described in greater detail by way of example with reference to the accompanying drawing, in which:

Fig. 1 is a longitudinal sectional view of a suitable plant for carrying out the process, and Fig. 2 is a sectional view on the line A—A of Fig. 1.

Referring to the drawing, ground spent oxide is charged from the bunker 1 into the digester 2 which is provided with a false bottom 3 carrying asbestos or glass cloth 4 (textile cloth was found to be unsuitable owing to its tendency to tender) and is also provided with a closed steam coil 5 and an open steam coil 5a. The spent oxide is charged in so that the depth of the bed does not exceed 3 feet.

Tetrachlorethane very heavily contaminated with tar from a previous operation is now pumped by pump 6a at 60–80° C. from storage tank 6 via line 7, valve 8, line 9a and valve 10 into the bottom of the digester 2 in sufficient quantity to cover the bed of spent oxide. Tetrachlorethane heavily contaminated with tar from a previous operation is now pumped by pump 11a at 60–80° C. from storage tank 11 via line 12, valve 13 and valve 14 into the top of the digester 2 and the displaced solvent is run off via valve 15, line 16, cooling tank 17 and valve 18 to the tar recovery still 19. Tetrachlorethane fairly heavily contaminated with tar from a previous operation is now pumped by pump 20a at 60–80° C. from storage tank 20 via line 21, valve 22 and valve 14 to the top of the digester 2, the displaced solvent being run off via valve 10, line 9a, valve 8 and line 7 to the storage tank 6. Clean tetrachlorethane from tank 23 is now pumped by pump 23a at 60–80° C. via valve 24 and valve 14 into the top of the digester 2, the displaced solvent being run off via line 9a, valve 13 and line 12 to the tank 11. The clean tetrachlorethane reaches the tank 23 from the crystallisers 25 and 26 via the valves 27 and 28 and lines 29, 30 and 31 and valve 31a. The displaced solvent is run off from the digester 2 via the valve 10, line 9a, valve 13 and line 12 to the tank 11.

Redistilled tetrachlorethane is now pumped by pump 32a at 60–80° C. from tank 32 via line 33, valve 34 and valve 14 into the top of the digester 2, the displaced solvent being run off via valve 10, line 9a, valve 12 and line 21 to tank 20.

The solvent in the digester 2 is now brought to the boil by heating with the closed steam coil 5 and kept at the boiling point for 30 minutes. The solution is then run off to the crystalliser 25, boiling tetrachlorethane being run in from tank 32, via line 33, valve 34 and valve 14, the solvent being heated by the heater 35. This treatment is continued until all the sulphur has been removed from the spent oxide. The concentration of the solution in the crystalliser 25 is now adjusted by the addition of redistilled tetrachlorethane until the sulphur content of the solution is about 30%. The solution is then cooled slowly to about 115° C. The solution has then separated into two layers. The bottom layer, which consists of a solution of about 10% of tetrachlorethane in molten sulphur contaminated with tar, is run into the crystalliser 26 via valve 36, line 37 and valve 38. The solution in the crystalliser 26 is then cooled to about 60° C., sulphur crystallises and the mother liquor is run off via valve 27, line 29, line 31, valve 31a, line 9 and valve 24 to the tank 23. The crystalliser 25 is provided with a closed steam coil 39 and an open steam coil 39a and these are now utilised to steam out the residue of tetrachlorethane and melt the sulphur which runs via valve 36, line 37 and valve 40 to the tank 41 from whence it runs via the valve 42 and line 43 to the flaking machine 44. Alternatively the sulphur from the tank 41 may be cast into blocks. The residue of solvent in the digester 2 is steamed off by the open steam coil 5a with dry steam and the solid residue is removed and treated for the recovery of Prussian blue in a separate plant (not shown).

The operations described above are now repeated several times until enough bottom layer sulphur has accumulated in the crystalliser 26 to allow a batch to be separated and crystallised. Redistilled tetrachlorethane is then run into the crystalliser 26 and the solution boiled by means of the closed steam coil 45. The solution is then treated for the recovery of sulphur as described above in connection with the crystalliser 25. The bottom layer in this case consists of a solution of about 10% of tetrachlorethane in contaminated sulphur and the sulphur is melted by the closed steam coil 45 and open steam coil 45a and is run off via the valve 38, line 37, valve 46 and line 47 to the tank 48.

It will be understood that the lines will be steam-jacketed where necessary to maintain the required temperature.

The extraction of the sulphur and tar by the process of the present invention has the further advantage that cyanides can be more easily extracted from the residue of the spent oxide by means of milk of lime in the usual manner and this can be effected simultaneously with the steaming employed to recover the solvent. Further extraction of the cyanides can also be effected afterwards if desired.

The sulphur which is obtained by the process contains less than 0.5% of tar and has the further advantage that the tar is non-volatile, that is to say, it does not distil or decompose on burning off the sulphur so long as molten sulphur is present.

I claim:

1. A process for extracting sulphur and tar from spent oxide which comprises treating said spent oxide with a solvent selected from the group consisting of trichlorethylene, tetrachlorethane and pentachlorethane in the liquid phase at a temperature at which the tar is soluble to a substantial extent in the solvent but at which the sulphur is relatively insoluble, and thereafter treating the residue with a further quantity of the same solvent in the liquid phase at a higher temperature at which the sulphur is soluble to a substantial extent.

2. A process for extracting sulphur and tar from spent oxide which comprises treating said spent oxide with a solvent selected from the group consisting of trichlorethylene, tetrachlorethane and pentachlorethane in the liquid phase at a temperature of between 60 and 80° C. and thereafter treating the residue with a further quantity of the same solvent in the liquid phase, the solvent being employed at its boiling point at the prevailing pressure.

ROLAND SYERS.